United States Patent
Greco et al.

(10) Patent No.: US 7,200,363 B2
(45) Date of Patent: Apr. 3, 2007

(54) COMMUNICATION DEVICE HAVING A SCENT RELEASE FEATURE AND METHOD THEREOF

(75) Inventors: Paul M. Greco, Parkland, FL (US); Stephen D. Hunt, Cooper City, FL (US); Joseph W. Seuck, Lauder Hill, FL (US)

(73) Assignee: Motorola, Inc., Schaumburg, IL (US)

( * ) Notice: Subject to any disclaimer, the term of this patent is extended or adjusted under 35 U.S.C. 154(b) by 472 days.

(21) Appl. No.: 10/349,006

(22) Filed: Jan. 22, 2003

(65) Prior Publication Data

US 2004/0203412 A1    Oct. 14, 2004

(51) Int. Cl.
H04B 7/00    (2006.01)
H04B 1/38    (2006.01)

(52) U.S. Cl. .................... 455/66.1; 455/550.1
(58) Field of Classification Search ............. 455/550.1, 455/575.1, 66.1, 567, 127.1; 392/390; 422/4; 428/905
See application file for complete search history.

(56) References Cited

U.S. PATENT DOCUMENTS 5,887,118 A * 3/1999 Huffman et al. ............ 392/390
2003/0206834 A1 * 11/2003 Chiao et al. ................. 422/124
2004/0003812 A1 * 1/2004 Manne .................... 128/204.11
2004/0203720 A1 * 10/2004 Shih et al. ................... 455/423
2004/0204043 A1 * 10/2004 Wang et al. ............. 455/556.1
2004/0235430 A1 * 11/2004 Ma et al. .................... 455/90.1
2005/0013728 A1 * 1/2005 Huang ........................... 422/4

FOREIGN PATENT DOCUMENTS

GB    2 292 271 A  *  2/1996

* cited by examiner

Primary Examiner—Nguyen T. Vo

(57) ABSTRACT

A communication device such as a cellular telephone (200) includes a heat-generating device (206) that generates heat energy. In thermal proximity to the heat-generating device (206) is a scent package (208) that includes a scented substance that is activated by the heat generated by the heat-generating device (206). In one embodiment of the invention, the heat-generating device (206) is a power amplifier. In another embodiment of the invention, a method of providing a scent in a communication device comprises providing a heat-generating device and placing a scent package in thermal proximity to the heat-generating device. The heat-generating device can be a power amplifier used by the communication device, or other electrical circuit found in the communication device.

18 Claims, 2 Drawing Sheets

COMMUNICATION DEVICE HAVING A SCENT RELEASE FEATURE AND METHOD THEREOF

TECHNICAL FIELD

This invention relates in general to the field of communications, and more specifically, to a communication device that has a scent release feature and a method for providing a scent release feature in a communication device.

BACKGROUND OF THE INVENTION

Plug-in air fresheners are very popular and are used to provide a fragrant scent to different areas in homes and offices. The plug-in air fresheners comprise an electrical unit that plugs into an alternating current (AC) wall outlet. The electrical unit includes a heating module such as a resistive circuit that generates heat energy, and a receptacle for receiving a scent carrying gel pack or scented liquid container in thermal proximity to the heating module. The temperature developed by the plug-in unit, approximately 54 degrees Celsius (° C.) for some plug-in units, activates the release of the scent in the gel pack or scented liquid container over time. The replaceable scent packages that are loaded into the plug-in units typically last a few weeks and are easily replaceable once they are depleted. Plug-in units typically provide a stronger scent over a broader area than non-plug-in scented items, given that the scents are activated by the heat energy in the plug-in devices.

As communication devices, such as portable cellular telephones become ever more popular, a greater percentage of people are using these devices so they can stay in touch with others while on they are on the move. Cellular telephone manufacturers are constantly looking for ways to differentiate their products in the marketplace by offering such things as changeable faceplates, different shaped products, etc. Some cellular telephone users are the same individuals who enjoy having plug-in scent units located around their homes, and may miss not having a nice smelling fragrance while they are on the go. Therefore, a need exists for a communication device such as a cellular telephone that can address some of the above-mentioned problems.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
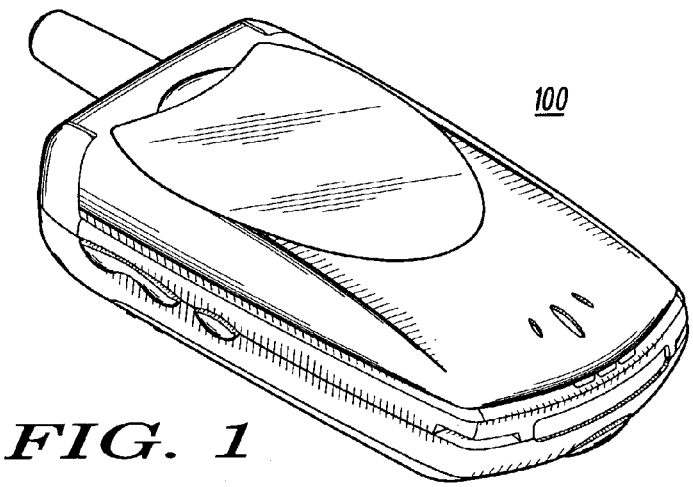
FIG. 1 shows a communication device in accordance with the invention.

While, the specification concludes with claims defining the features of the invention that are regarded as novel, it is believed that the invention will be better understood from a consideration of the following description in conjunction with the drawing figures.

Figure 2:
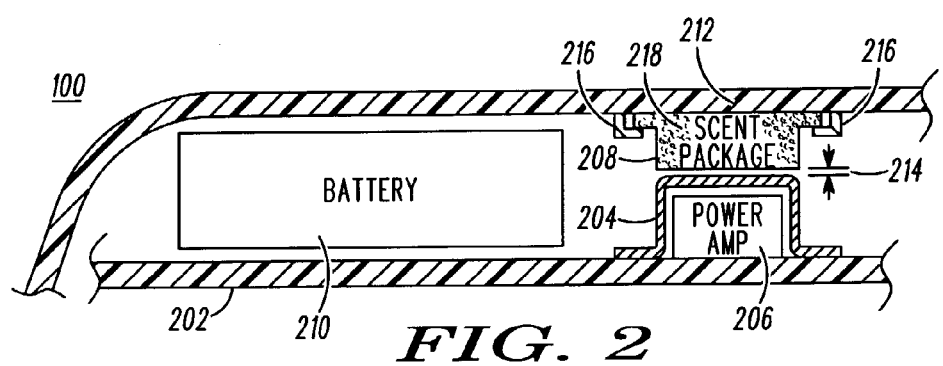
FIG. 2 shows a partial cross-sectional view of the communication device in FIG. 1 in accordance with the invention.

Referring now to FIG. 1, there is shown a communication device 100 such as a cellular telephone having a scent release feature in accordance with the invention. Other communication devices, such as portable AM/FM radios, computers, and other devices can take advantage of the invention. In FIG. 2, a partial cross-sectional view of cellular telephone 100 is shown. Located on a printed circuit board 202 is a heat-generating device such as a radio frequency power amplifier 206. A metal shield 204 provides heat dispersion and radio interference protection to the power amplifier circuit 206. A battery 210 is located in the battery compartment of the radio that is located between the printed circuit board 202 and battery cover 212.

In accordance with the invention, a scent package 208 having a scented substance 218 there within is retained in thermal proximity to the power amplifier 206 or other heat-generating circuit found inside of the cellular telephone. Thermal proximity meaning that the scent package 208 is located a distance 214 to the power amplifier 206 (or other heat-generating circuit) that allows the heat energy generated by the power amplifier 206 to activate or enhance the delivery of the scented substance 218 inside of scent package 208. The scent package 208 can be a replaceable scented gel package such as those used in plug-in fresheners like the Glade™ air freshener manufactured by S. C. Johnson Wax.

The scent package 208 can be held in place by a set of retainers 216 which retain the scent package 208 in proper alignment with the power amplifier 206, but yet allows for easy replacement of the scent package 208. The distance 214 between the scent package 208 and the power amplifier 206 will depend on factors such as the amount of heat energy and temperature developed by the power amplifier 206, and the type of scent package 208 being used. The scent package 208 can be designed to make direct contact with power amplifier shield 204 or can be located a short distance away. If the scent package 208 makes direct contact with shield 204, the scent package will provide the additional benefit of providing additional heat dissipation for heat generated by the power amplifier 206 or other heat-generating device or circuit.

Several tests have found that the typical power amplifier used in for example an IDEN i500™ cellular telephone manufactured by Motorola, Inc. reaches a temperature of about 60° C., which is more than enough to activate the fragrance in a gel based scent package.

Figure 3:
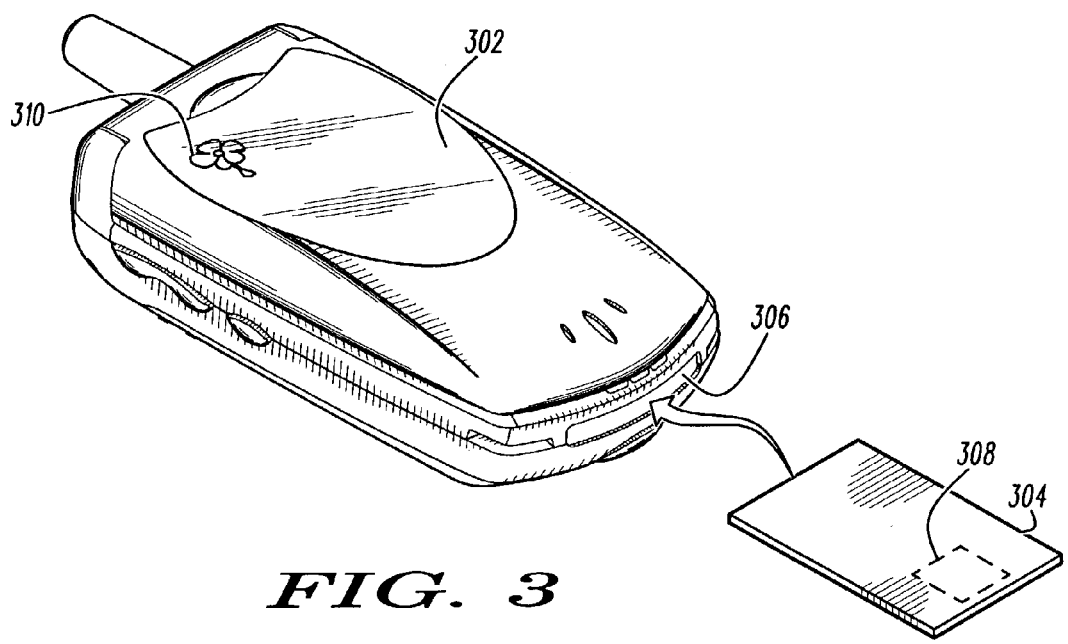
FIG. 3 shows a cellular telephone and external card having a scent package in accordance with another aspect of the invention.

In another embodiment of the invention shown in FIG. 3, instead of having to remove the battery cover 212 of the cellular radio to replace a depleted scent package as would be the case in the design shown in FIG. 2, a scent package 308 is loaded into the cellular telephone 302 using a removable card 304 that is inserted into the cellular telephone 302 through a slot 306 located on the cellular telephone 302. The removable card 304 includes a scent package 308 that is part of the card 304 in the case of a one-time use design, or alternatively, which can be placed onto the card 304 and replaced when depleted. Card 304 can be a phone service card such as those used with prepaid digital phones, a memory card, or other type of plug-in card that can be loaded onto a communication device. When inserted into cellular telephone 302, the scent package 308 is placed in thermal proximity to a heat-generating device (not shown) located inside of cellular telephone 302.

Figure 4:
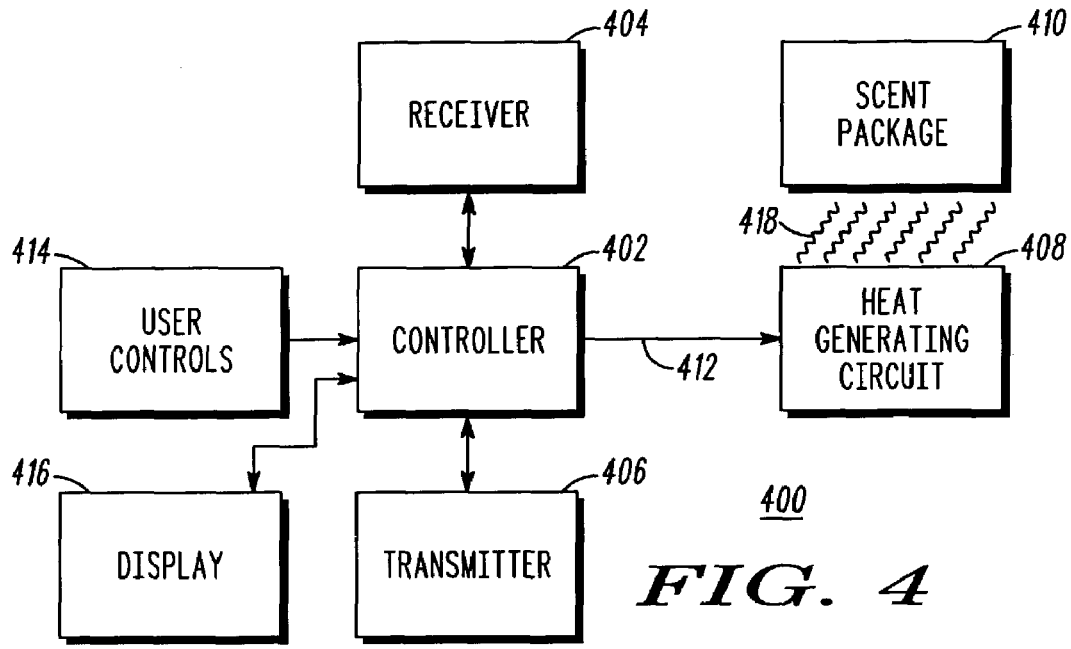
FIG. 4 shows a block diagram of a communication device in accordance with still another aspect of the invention.

Although, the designs discussed above have used circuits that are generating heat energy during the normal use of the cellular telephone (e.g., power amplifier) and thus no extra power is wasted in providing the heat energy used to activate the scent package, in still another embodiment of the invention, shown in FIG. 4, a heat-generating circuit 408 is caused to generate heat energy 418 on demand in response to receiving a control signal 412 from a controller 402. The controller 402 can be for example a microprocessor, digital signal processor or other control hardware/software known in the art. Communication device 400 includes a receiver section 404 and a transmitter section 406.

The heat-generating circuit 408 can include among other things, a resistive network or other heat-generating circuit along with the necessary power transistors, etc. that can generate a sufficient amount of heat energy to activate the scent in scent package 410. The control signal 412 used to activate the heat-generating circuit 408 can be generated by the controller 402 in response to receiving a user control input via the user controls 414. The user controls 414 can be a control key or set of keys located in the cellular radio 400. The controller 402 can cause the heat-generating circuit 408 to generate heat for a predetermined period of time after the control signal 412 is sent, or can require the cellular telephone user to press another set of user controls 414 to deactivate the heat-generating circuit 408.

The controller 402 can cause an icon (see as example icon 310 in FIG. 3) to be displayed by display 416 that would alert the cellular telephone user that the heat-generating circuit is causing the scent package 410 to release a scent. In still another aspect of the invention, a particular message (e.g., from a particular person) or type of message received by receiver 404 can automatically cause controller 402 to generate the control signal 412. A user alert such as an audio or visual alert can be provided and controlled by controller 402 which could alert the cellular telephone user that it is time to replace the scent package. The controller 402 can generate a timer that can keep track of the amount of time that has elapsed since the scent package was installed and provide an alert signal upon the timer expiring. The alert signal could be a tone, or a change to the icon 308 (e.g., icon 308 could begin blinking, etc.).

Figure 5:
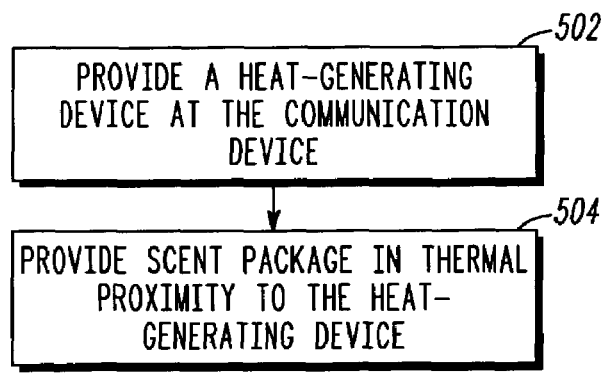
FIG. 5 shows a simplified flow diagram of the steps taken to provide a scent in a communication device in accordance with the invention.

In FIG. 5, there is shown a flow diagram highlighting the steps taken in accordance with the invention. In step 502, a heat-generating device found in the communication device such as a power amplifier, etc. is provided. In step 504, a scent package is provided in thermal proximity to the heat-generating device. The heat-generating device provides heat energy that helps in activating the scented substance in the scent package.

In a cellular radio several heat-generating circuits can be considered as potential heat generators that can be used to activate the scent package. Although the RF power amplifier is a device that produces a good amount of heat energy and a high enough temperature, other devices such as the battery pack, crystal, or other circuit in the communication device may be a potential candidates depending on the type of scent package being used, and other design criteria.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication device, comprising:
   a heat-generating device; and
   a scent package having a scented substance located in thermal proximity to the heat-generating device.
   wherein the heat-generating device is part of the communication device and the heat-generating device is a dual-purpose device in that the heat-generating device enables operation of the communication device and heat provided by the heat-generating device for heating the scent package is a byproduct of that enablement.

2. A communication device as defined in claim 1, wherein the heat-generating device comprises a power amplifier used by the communication device.

3. A communication device as defined in claim 1, wherein the scent package comprises a gel or liquid based scent package.

4. A communication device as defined in claim 1, further comprising:
   a removable card;
   a slot for receiving the removable card located on the communication device; and
   wherein the scent package is attached to the removable card.

5. A communication device as defined in claim 1, further comprising:
   at least one control key; and
   wherein the heat-generating device commences to generate heat in response to the at least one control key being activated.

6. A communication device as defined in claim 5, wherein the heat-generating device produces heat for a predetermined period of time after the control key is activated.

7. A communication device as defined in claim 5, further comprising:
   a display, and the display in response to the at least one control key being activated, causes an icon to be presented on the display.

8. A communication device as defined in claim 1, wherein the heat-generating device commences to generate heat in response to a message being received by the communication device.

9. A communication device as defined in claim 1, wherein the heat-generating device comprises a battery.

10. A communication device as defined in claim 1, wherein the heat-generating device produces heat energy that activates the scented substance and causes a scent to be released from the scent package.

11. A cellular telephone, comprising:
    a power amplifier that enables operation of the cellular telephone; and
    a scent package thermally proximate to the power amplifier, wherein the power amplifier and the scent package are configured to permit the power amplifier to provide heat to the scent package as a byproduct of the power amplifiers enablement of operation of the cellular telephone.

12. A cellular telephone as defined in claim 11, wherein the cellular telephone has a battery compartment, and the scent package is located within the battery compartment.

13. A cellular telephone as defined in claim 12, wherein the battery compartment includes a removable battery compartment cover, and the battery compartment cover has at least one retainer for receiving the scent package.

14. A cellular telephone as defined in claim 11, further comprising a shield cover surrounding at least a portion of the power amplifier; and the scent package is in contact with the shield.

15. A cellular telephone as defined in claim 11, wherein the scent package is filled with a gel that is activated by the heat generated by the power amplifier.

16. A method of producing a scent in a communication device, comprising the steps of:
   providing a heat-generating device which is part of the communication device and enables operation of the communication device; and
   providing a scent package having a scented substance in thermal proximity to the heat-generating device such that the heat produced by the heat-generating device when the heat-generating device enables operation of the communication device causes the scented substance to activate and provide an aroma.

17. A method as defined in claim 16, wherein the communication device comprises a cellular telephone and the heat-generating device comprises a power amplifier used by the cellular telephone during normal operation.

18. A method as defined in claim 16, wherein the communication device includes a controller, and the step of providing a heat-generating device comprises the sub-steps of:
   providing an electrical circuit coupled to the controller; and
   providing a control signal from the controller to the electrical circuit that causes the electrical circuit to produce heat.

* * * * *